May 16, 1939.  S. A. LIMPERT ET AL  2,158,877
EVAPORATOR UNIT FOR REFRIGERATION PURPOSES
Filed July 24, 1937  5 Sheets-Sheet 2

INVENTORS:
Sylvester A. Limpert
Alexander S. Limpert
BY
Their ATTORNEY.

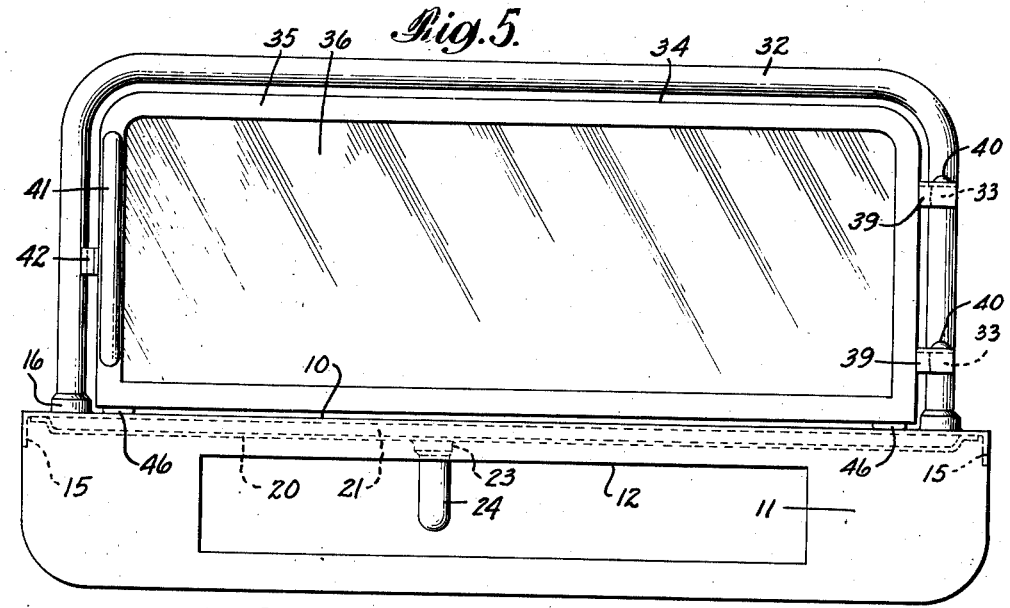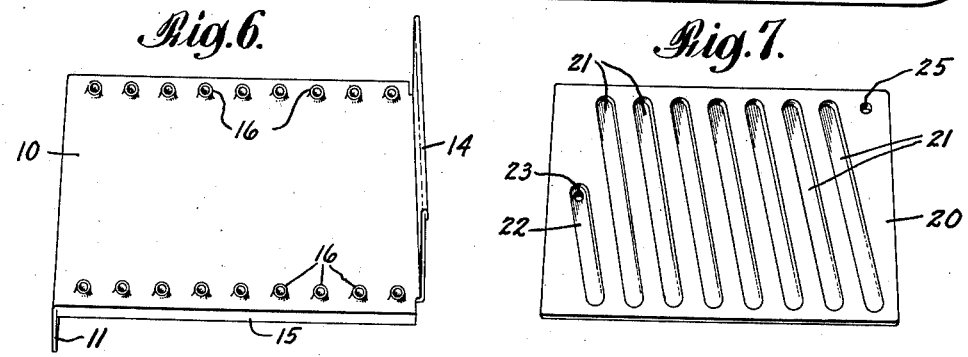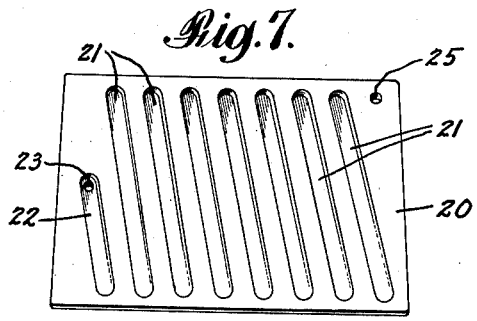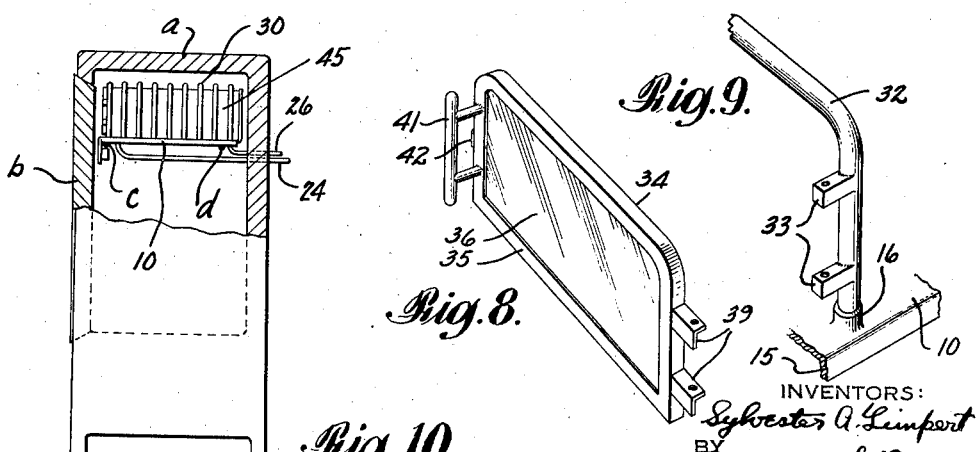

May 16, 1939.  S. A. LIMPERT ET AL  2,158,877
EVAPORATOR UNIT FOR REFRIGERATION PURPOSES
Filed July 24, 1937   5 Sheets-Sheet 4

INVENTORS:
Sylvester A. Limpert
BY Alexander S. Limpert
Their ATTORNEY.

May 16, 1939.   S. A. LIMPERT ET AL   2,158,877
EVAPORATOR UNIT FOR REFRIGERATION PURPOSES
Filed July 24, 1937   5 Sheets-Sheet 5
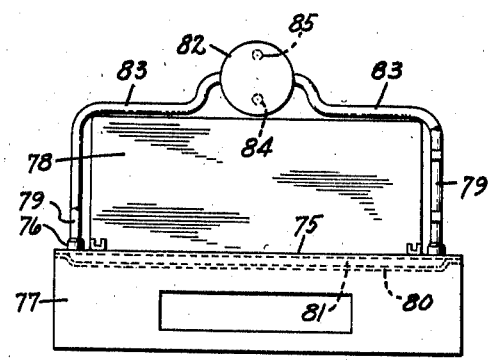
Fig.15.
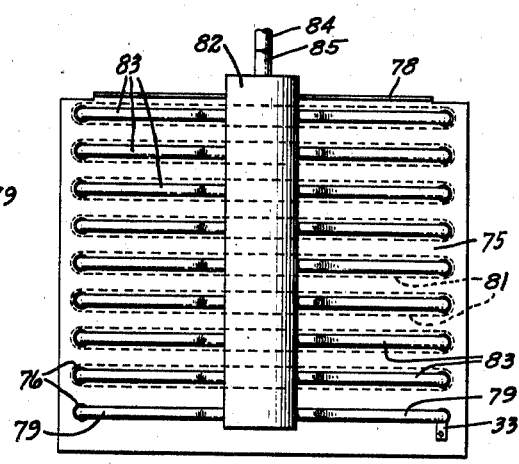
Fig.16.
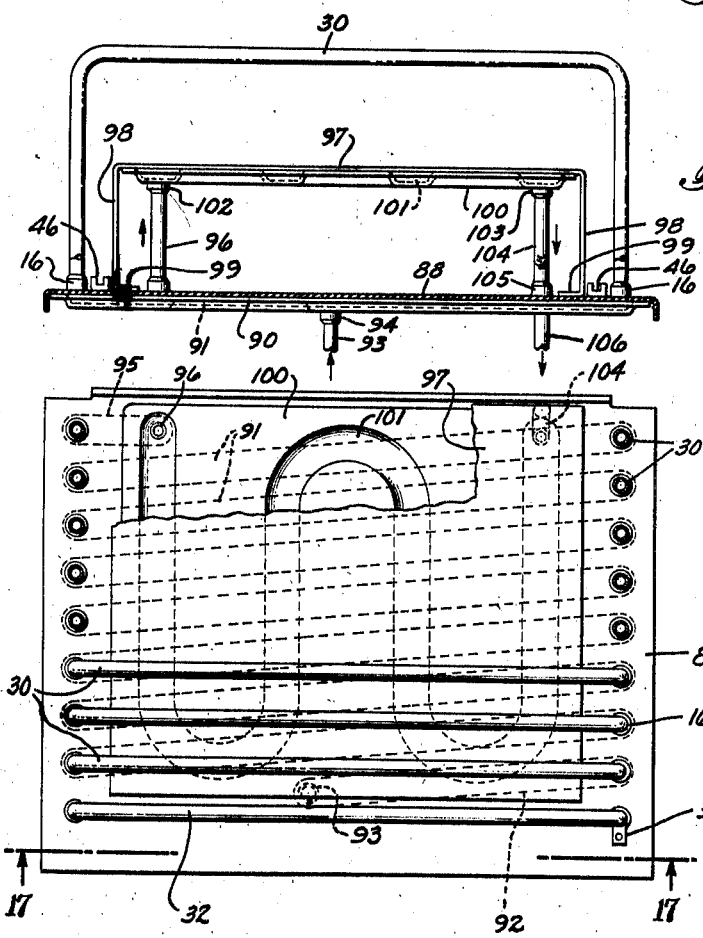
Fig.17.
Fig.18.
INVENTORS:
Sylvester A. Limpert
BY Alexander S. Limpert
Their ATTORNEY.

Patented May 16, 1939

2,158,877

UNITED STATES PATENT OFFICE 2,158,877

EVAPORATOR UNIT FOR REFRIGERATION PURPOSES

Sylvester A. Limpert and Alexander S. Limpert, Bay Shore, N. Y.

Application July 24, 1937, Serial No. 155,510

4 Claims. (Cl. 62—126)

This invention relates to cooling or so-called evaporator units for the low-side of automatic refrigerators, either of the electric or heat type, and has for its particular objects the production of such a unit which is highly efficient in operation, sturdy, cheap, of attractive appearance and which has a cooling compartment whose top and sides are preferably formed of transparent heat-insulating material whereby the tendency for frost to collect on the inner surface thereof is prevented or minimized so that during defrosting of the unit there is little or no possibility of water dripping from such cover into or upon articles stored in such unit. Other objects of the invention will hereinafter appear.

The invention is described in detail in the following description and drawings forming a part thereof, in which latter Figure 1 is a plan view of an embodiment of our invention wherein the refrigerant conduits comprise tubing desirably of chrome plated or cadmium plated copper which completely envelopes the transparent cover and the metal bottom plate of the cooling compartment;

Fig. 5 is a front elevation of the unit shown in Fig. 1;

Figs. 6 and 7 are perspective views of the refrigerated bottom plate, isolated, viewed from above and below respectively;

Fig. 8 is a perspective view of door of the unit, isolated;

Fig. 9 is a fragmentary perspective view of the door jamb, isolated;

Fig. 10 is an elevation, partly broken away, of a refrigerator cabinet equipped with our improved unit;

Fig. 15 is a front elevation and Fig. 16 a plan view of a modification showing our invention applied to an evaporator of the flooded type;

Fig. 17 is a front elevation of a modification showing a unit having a supplemental refrigerated shelf, the transparent cover being removed;

Fig. 18 is a plan view, partly broken away of the unit shown in Fig. 17.

Figure 1:
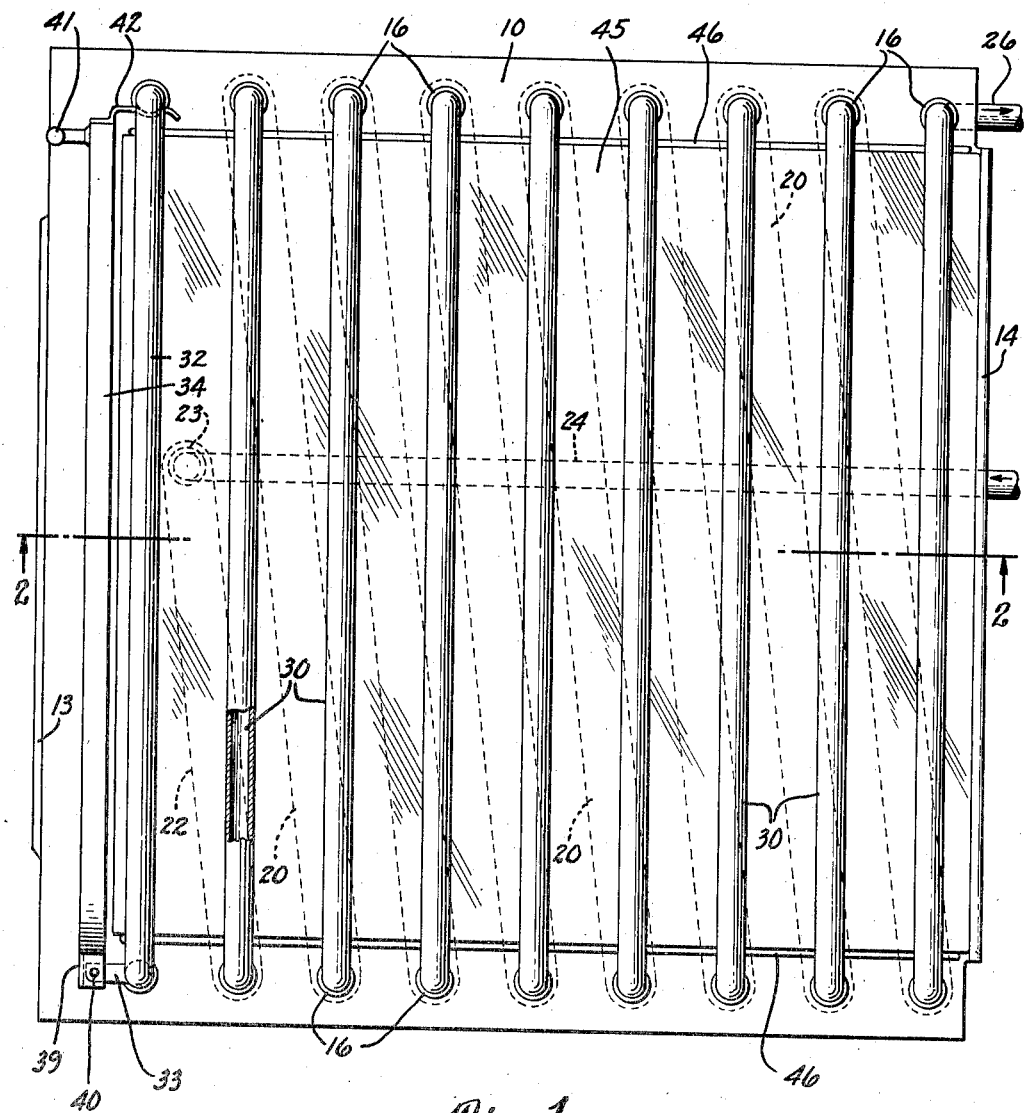

Referring to the drawings and the construction shown therein, the reference numeral 10 designates the top sheet of a refrigerated double bottom of an evaporator unit, the said sheet having a depending front end 11 which is apertured, as indicated by the reference numeral 12, to receive the conventional cold control attachment 13. Said plate has an upwardly projecting rear end 14, the rear wall of the cooling and depending sides 15. At intervals along the lateral margins of the sheet, nipple members 16 are struck up which function as hereinafter described. A cooperating sheet 20, which has a series of parallel, transversely inclined grooves 21, of generally semi-circular cross section, formed therein, is welded to the sheet 10 and serves as the bottom wall of the said double bottom of the evaporator unit. These grooves 21 and an abbreviated groove 22 serve to interconnect the nipple 23 formed on sheet 20, and which nipple is connected to the outlet of a refrigerant intake conduit 24, first with a nipple 16 at one side of the double bottom of the unit, then with another nipple 16 at the other side of said bottom, and so on, successively, up to the last of said nipples 16 and thence with a nipple 25 formed on the bottom sheet 21, and which latter registers with the last nipple 16 of said series of lateral nipples. A refrigerant outlet conduit 26 is connected to said nipple 25.

A plurality of U-shaped metal conduits 30 formed of metal tubing, each of which conduits is connected to diametrically opposed nipples 16, serve to complete the circuit from the outlet of the refrigerant intake-conduit 24 and the inlet of the refrigerant outlet-conduit 26. The opposing nipples 16 at the front end of the unit are not connected into said refrigerant circuit but are adapted to receive a solid U-shaped rod 32 which serves as a jamb for the door of the unit, the same being equipped with hinge leaves or lugs 34. The door comprises a metal frame 35 which serves to retain a glass plate 36 that is elastically mounted in a grooved rubber gasket 37 carried by said frame and retained therein by clips 38. Cooperating hinge leaves 39 are pivotally connected by the pintles 40 to the hinge leaves 33. The handle 41 of the door is provided with a spring clip 42 serves to hold the same in a closed position while admitting of the convenient opening thereof when desired.

A cover or shell 45, preferably composed of a U-shaped sheet of glass, mica (isinglass) or of other heat-insulating waterproof material as lucite or of the well known condensation products of artificial resins, is interposed between the refrigerant cage and the bottom of the unit the same being preferably slidably mounted in grooved gaskets 46, of rubber or other waterproof heat insulating material, that are riveted to the bottom of the unit.

A shelf 50 formed of a single sheet of metal having depending sides 51 and inwardly offset feet 52 is mounted on the sheet 10 preferably being brazed thereto. An intermediate metal partition 53, having oppositely extending offset lugs 54 and 55 at its opposite ends, serves as an intermediate heat-conducting support for said shelf and also to subdivide the compartment below said shelf into two chambers. Trays 56, 57 and 58 may be conveniently inserted, in the manner shown, on the shelf 50 and into the two chambers beneath said shelf.

Figure 13:
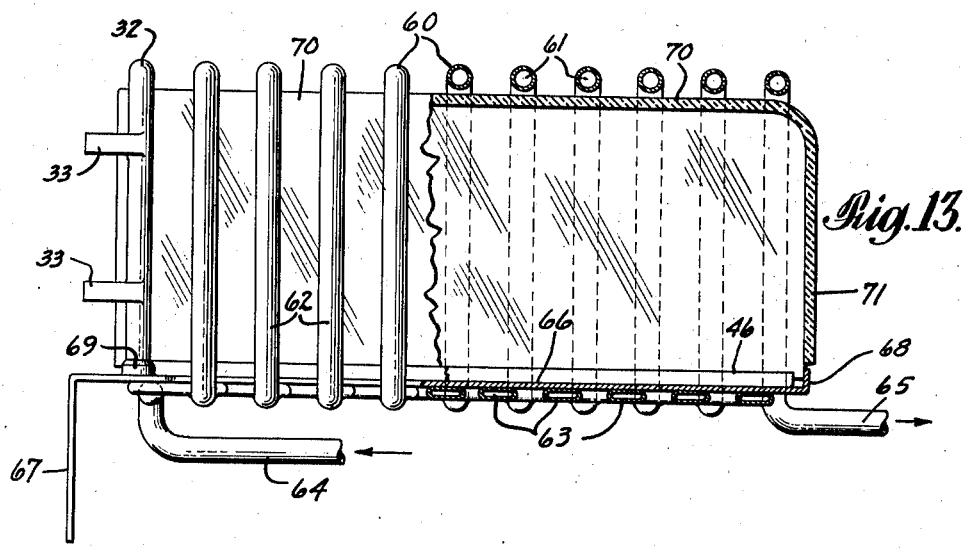
Fig. 13 is an elevation, partly in section, of a modification in which the refrigerant coil is a one-piece assembly.
Figure 14:
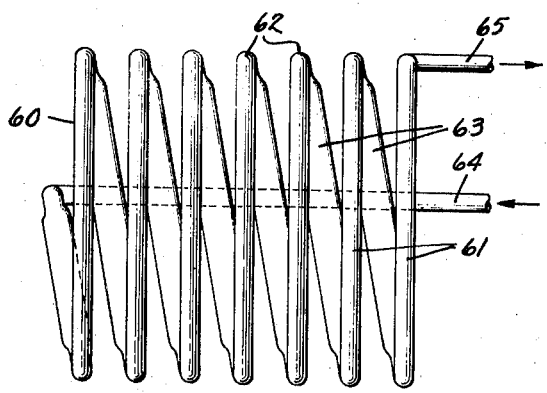
Fig. 14 is a plan view of said one-piece coil.

Referring to the construction shown in Figs. 13 and 14, the reference numeral 60 designates a unitary coil or cage formed of metal tubing, having substantially vertical sides 62 and of flattened or rectangular cross section across the bottom reaches 63 thereof. The door jamb corresponds to that shown in Fig. 2, being formed of a solid bar of plated metal, whereby the tendency for the same to become frosted is minimized and the attractive appearance of the jamb is preserved at all times.

Refrigerant supply and outlet conduits 64 and 65 are connected to the opposite ends of said coil, the bottom sheet 66 has a depending front end 67, which may also be apertured to receive a cold control attachment if desired, and the rear end 68 of said sheet is abbreviated since the cover or shell 70 which is employed has a wall 71 that serves to close the rear end of the unit. The flattened, oblique reaches 63 of the coil employed in this modification are brazed or welded directly to the sheet 66.

In Figs. 15 and 16, the sheet 75 is provided with nipples 76 along its lateral margins which are similar to the nipples 16 shown in Fig. 1 and said sheet also has a depending front end 77 and upturned rear end 78 generally similar to that of sheet 10 shown in Fig. 1. The door jamb 79 is formed, preferably, of a solid bar whereby, as stated, frosting thereof is minimized.

The bottom sheet 80, which is welded to the sheet 75, has a series of parallel conduits 81 of, generally semi-circular cross section, stamped therein. A reservoir or tank 82 is supported on and communicates with conduits 83 and these conduits communicate in turn with the nipples 76 to which they are soldered or otherwise secured in gas tight relation. Refrigerant inlet and outlet pipes 84 and 85 serve to supply the tank with refrigerant liquid in the well known manner.

In Figs. 17 and 18, wherein the shelf is directly refrigerated, the reference numeral 88 designates a sheet similar to the sheet 10 of Fig. 1 and the numeral 90 refers to a double bottom, which is welded thereto, having oblique grooves 91 and 92 formed therein that interconnect the tubes 30 with each other in series. The abbreviated groove 92 interconnects the first tube of the series of tubes 30 with the refrigerant intake conduit 93, the latter being soldered to the nipple 94 that communicates with such conduit. A conduit 95 affords communication between the last tube of said series and the hollow post or conduit 96. A shelf 97, having depending sides 98 and offset feet 99, is mounted on the plate 88. Said shelf has a double bottom 100 welded thereto which has a continuous convolute groove 101 stamped therein that serves as a refrigerant conduit, the same being in communication through the nipple 102 with the conduit 96, through which refrigerant can enter said coil, and through the nipple 103 with the hollow post or conduit 104 that communicates through the nipple 105 with the refrigerant outlet conduit 106.

Figure 2:
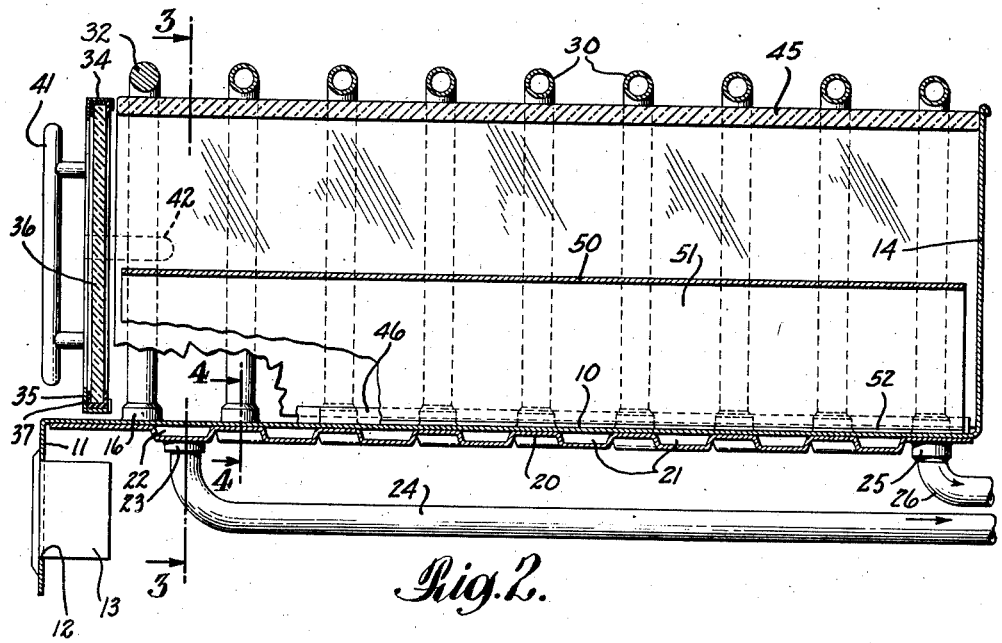
Fig. 2 is a vertical longitudinal section taken on the line 2—2 of Fig. 1.
Figure 3:
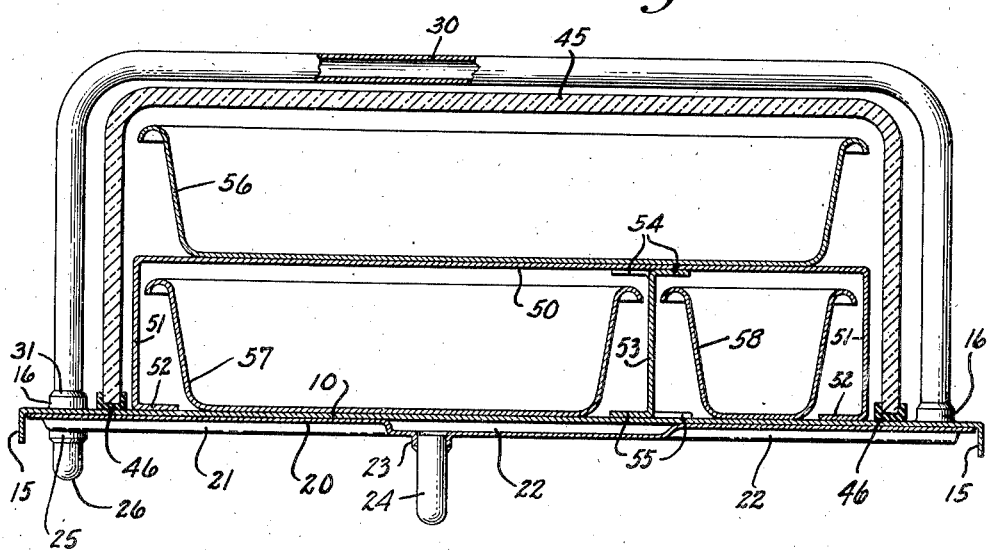
Fig. 3 is a transverse section taken on the line 3—3 of Fig. 2.
Figure 4:
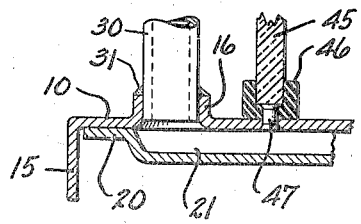
Fig. 4 is a fragmentary detail section showing the manner in which the looped refrigerant conduits and the transparent shell are supported on the bottom plate.
Figure 11:
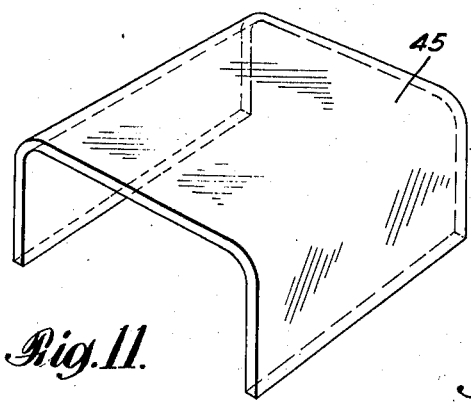
Fig. 11 is a perspective view of the transparent shell of the unit, isolated.
Figure 12:
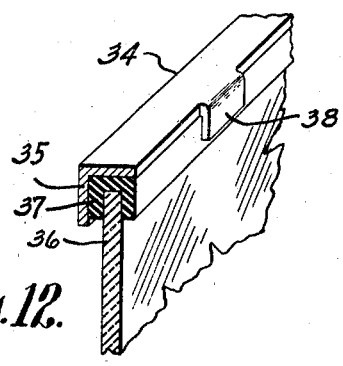
Fig. 12 is a fragmentary detail perspective view, partly in section, of the door.

In the modifications shown in Figs. 15 to 18, the glass shell, corresponding to the shell 45 shown in Fig. 2 for example, and which is also intended to be utilized, in these modifications, has been omitted.

In Fig. 10, our improved unit is shown in position in a refrigerator cabinet $a$ which has a front door $b$ and supporting bracket $c$.

Our improved unit is unusually efficient both as regards the maintenance of the desired temperature in the food compartment of the refrigerator, due to the effective contact of the circulatory air currents in the refrigerator with the cooling coils and also as regards speed of ice cube freezing, due to the effective insulation of the ice tray compartment by the shell of heat insulation material from the heating effect of such air current circulating around said unit. Furthermore due to the spacing of such shell from the refrigerant conduits and the supplemental insulation thereof from the refrigerated bottom of the unit, there is as stated no tendency for frost to accumulate on the inner surface of the top of the shell with consequence that all tendency for contaminating water to drop onto food or ice cubes stored in the unit is practically eliminated during defrosting of such unit. The glass shell due to its transparency not only enhances the beaty of the unit but admits of the ice trays being observed without necessitating the opening of the door of the unit and the removal of such trays to ascertain if the desired ice cubes have been formed.

The aforesaid unit is especially sanitary due to the complete absence of crevices and obstructions which would promote the growth of bacteria or prevent the easy and thorough cleaning thereof with a damp cloth or the like when the refrigerator is periodically defrosted and cleaned.

The very fact that the refrigerant coil envelopes the top and sides of the insulated shell minimizes the circulation of air currents in the space between the coils and the shell and particularly insures of the shell being responsive to the temperature of the refrigerant passing through the coils rather than to the heating effect of such air currents which are circulating in the compartment of the refrigerator in which the cooling unit is mounted. Moreover, due to the spacing of the coils from the shell the latter does not become excessively cold on its external surface and consequently there is little tendency for frost to collect thereon and prevent observation of the contents of the unit. Furthermore, owing to the tendency for the coils as they become frosted to form a snow blanket and thereby produce a dead air space between the coils and the shell, there is no tendency for undue accumulation of frost in such space such as would eventually create sufficient pressure on the shell to fracture the same, even though the unit is only defrosted at long intervals of time. Moreover the deposition of moisture as frost on the coil tends to lower the dew-point at which condensation would occur on the glass shell, which latter is at a lower temperature than said coil, and consequently this also contributes to prevent the formation of frost on said shell.

The introduction of the refrigerant, in the flooded system, into the reservoir is controlled in a well known manner by means of a float valve located therein or by an external float valve or by a thermostatic expansion valve associated with a feeler bulb.

Various changes in the details of construction shown herein may be made without departing from the spirit of our invention as embraced in the scope of the appended claims.

Having thus described our invention, what we claim is:

1. A cooling unit for refrigeration purposes, comprising, a base, a refrigerant coil supported thereby and a shell, of heat-insulation material and having an open bottom, supported within said coil.

2. A cooling unit for refrigeration purposes, comprising a metal base member, a refrigerant coil thermally associated therewith and a shell of heat-insulation material, having an open bottom, supported within said coil and in spaced relation thereto.

3. A cooling unit for refrigeration purposes, comprising a base member having obliquely and transversely extending refrigerant conduits therein, a shell supported by said base member in heat-insulated relation therewith and a series of tubular conduits enveloping the sides and top of said shell, said latter conduits and the conduits in said base member being in series circuit with each other.

4. A cooling unit for refrigeration purposes having a base member, a transparent shell of heat insulation material supported thereon and a refrigerant coil associated with said base and enveloping the top and sides of said shell in spaced relation thereto.

SYLVESTER A. LIMPERT.
ALEXANDER S. LIMPERT.